United States Patent
Atkins

(10) Patent No.: US 9,420,196 B2
(45) Date of Patent: Aug. 16, 2016

(54) IMAGE FORMATS AND RELATED METHODS AND APPARATUSES

(71) Applicant: DOLBY LABORATORIES LICENSING CORPORATION, San Francisco, CA (US)

(72) Inventor: Robin Atkins, Campbell, CA (US)

(73) Assignee: Dolby Laboratories Licensing Corporation, San Francisco, CA (US)

(*) Notice: Subject to any disclaimer, the term of this patent is extended or adjusted under 35 U.S.C. 154(b) by 0 days.

(21) Appl. No.: 14/923,370

(22) Filed: Oct. 26, 2015

(65) Prior Publication Data

US 2016/0050353 A1 Feb. 18, 2016

Related U.S. Application Data

(63) Continuation of application No. 14/622,788, filed on Feb. 13, 2015, now Pat. No. 9,202,438, which is a continuation of application No. 13/626,430, filed on Sep. 25, 2012, now Pat. No. 8,988,552.

(60) Provisional application No. 61/539,438, filed on Sep. 26, 2011.

(51) Int. Cl.
*H04N 5/235* (2006.01)
*H04N 9/73* (2006.01)
(Continued)

(52) U.S. Cl.
CPC ............... *H04N 5/2353* (2013.01); *G06T 1/20* (2013.01); *G09G 3/3406* (2013.01); *G09G 5/10* (2013.01); *H04N 5/235* (2013.01); *H04N 5/262* (2013.01); *H04N 5/57* (2013.01); *H04N 21/42202* (2013.01); *H04N 21/4318* (2013.01); *G09G 2320/0673* (2013.01); *G09G 2360/144* (2013.01)

(58) Field of Classification Search
CPC ..... H04N 5/235; H04N 5/2353; H04N 5/262; H04N 5/57; H04N 21/4318; H04N 21/42202; H04N 1/6027; H04N 1/603; H04N 19/00781; G06T 1/20; G09G 3/3406; G09G 5/10; G09G 2320/0673; G09G 2360/144
See application file for complete search history.

(56) References Cited

U.S. PATENT DOCUMENTS

| 5,276,779 A | 1/1994 | Statt |
| 6,370,265 B1 | 4/2002 | Bell et al. |

(Continued)

FOREIGN PATENT DOCUMENTS

| EP | 0103488 | 3/1984 |
| GB | 2311432 | 3/1996 |

(Continued)

OTHER PUBLICATIONS

Supplemental Notice of Allowability issued for U.S. Appl. No. 14/363,129, filed Jun. 5, 2014 in the name of Jon Scott Miller et al. Mail date: May 8, 2015.

(Continued)

*Primary Examiner* — Aung S Moe
*Assistant Examiner* — John H Morehead, III

(57) ABSTRACT

Image data may be color graded, distributed and viewed on target displays. Mappings that preserve mid-range points and mid-range contrast may be applied to view the image data for color grading and to prepare the image data for display on a target display. The image data may be expanded to exploit the dynamic range of the target display without affecting mid-tone values.

7 Claims, 12 Drawing Sheets

(51) Int. Cl.
*G06K 9/38* (2006.01)
*H04N 5/262* (2006.01)
*G09G 5/10* (2006.01)
*G06T 1/20* (2006.01)
*G09G 3/34* (2006.01)
*H04N 5/57* (2006.01)
*H04N 21/422* (2011.01)
*H04N 21/431* (2011.01)

(56) References Cited

U.S. PATENT DOCUMENTS

| | | | |
|---|---|---|---|
| 6,388,648 B1 | 5/2002 | Clifton et al. | |
| 6,847,376 B2 | 1/2005 | Engeldrum et al. | |
| 6,989,859 B2 | 1/2006 | Parulski | |
| 7,019,763 B2 | 3/2006 | Kimura | |
| 7,023,580 B2 | 4/2006 | Zhang et al. | |
| 7,046,400 B2* | 5/2006 | Gindele | H04N 1/407 |
| | | | 358/1.9 |
| 7,158,673 B2 | 1/2007 | Nakabayashi et al. | |
| 7,164,284 B2 | 1/2007 | Pan et al. | |
| 7,170,477 B2 | 1/2007 | Okamoto et al. | |
| 7,221,807 B2 | 5/2007 | Campbell | |
| 7,266,229 B2 | 9/2007 | Couwenhoven et al. | |
| 7,268,763 B2 | 9/2007 | Fukuda et al. | |
| 7,283,654 B2 | 10/2007 | McLain | |
| 7,345,682 B2 | 3/2008 | Honda et al. | |
| 7,382,382 B2 | 6/2008 | Furukawa et al. | |
| 7,576,750 B2 | 8/2009 | Eckhardt et al. | |
| 7,710,387 B2 | 5/2010 | Yamaguchi | |
| 7,782,405 B2 | 8/2010 | Kerofsky | |
| 7,826,681 B2 | 11/2010 | Kerofsky et al. | |
| 8,260,080 B1* | 9/2012 | Wilensky | G06T 5/007 |
| | | | 382/274 |
| 8,988,552 B2* | 3/2015 | Atkins | H04N 5/235 |
| | | | 348/229.1 |
| 9,077,994 B2 | 7/2015 | Miller et al. | |
| 9,202,438 B2* | 12/2015 | Atkins | H04N 5/235 |
| 2001/0050757 A1 | 12/2001 | Yoshida et al. | |
| 2002/0075136 A1 | 6/2002 | Nakaji et al. | |
| 2002/0080245 A1 | 6/2002 | Parulski et al. | |
| 2003/0151781 A1 | 8/2003 | Ono | |
| 2003/0174284 A1 | 9/2003 | Stewart | |
| 2004/0036799 A1 | 2/2004 | Weitbruch et al. | |
| 2004/0066979 A1* | 4/2004 | Gindele | G06K 9/40 |
| | | | 382/274 |
| 2005/0052363 A1 | 3/2005 | Jeong | |
| 2005/0078863 A1 | 4/2005 | Ito | |
| 2006/0176407 A1 | 8/2006 | Ikeda et al. | |
| 2006/0197968 A1 | 9/2006 | Vannostrand | |
| 2007/0067124 A1 | 3/2007 | Kimpe et al. | |
| 2007/0127093 A1 | 6/2007 | Kuno | |
| 2007/0236517 A1 | 10/2007 | Kimpe | |
| 2008/0024398 A1 | 1/2008 | Hwang | |
| 2008/0043262 A1* | 2/2008 | Ovsiannikov | H04N 1/4072 |
| | | | 358/1.9 |
| 2008/0094426 A1 | 4/2008 | Kimpe | |
| 2008/0094515 A1 | 4/2008 | Gutta et al. | |
| 2008/0097203 A1 | 4/2008 | Nereson et al. | |
| 2008/0170031 A1 | 7/2008 | Kuo | |
| 2008/0186707 A1 | 8/2008 | Ku et al. | |
| 2009/0109293 A1 | 4/2009 | Coley et al. | |
| 2009/0141121 A1 | 6/2009 | Kimpe | |
| 2009/0167672 A1* | 7/2009 | Kerofsky | G09G 3/3413 |
| | | | 345/102 |
| 2009/0190716 A1 | 7/2009 | Yang et al. | |
| 2009/0201309 A1 | 8/2009 | Demos | |
| 2009/0203999 A1 | 8/2009 | Rust et al. | |
| 2009/0267876 A1 | 10/2009 | Kerofsky | |
| 2009/0304279 A1 | 12/2009 | Mori | |
| 2010/0002156 A1 | 1/2010 | Tsou et al. | |
| 2010/0007599 A1 | 1/2010 | Kerofsky | |
| 2010/0118008 A1 | 5/2010 | Matsuoka | |
| 2010/0128057 A1* | 5/2010 | Doser | G06F 3/14 |
| | | | 345/593 |
| 2010/0226547 A1 | 9/2010 | Criminisi et al. | |
| 2011/0032286 A1 | 2/2011 | Takata | |
| 2011/0128263 A1 | 6/2011 | Abe | |
| 2011/0129148 A1* | 6/2011 | Kisilev | G06T 5/009 |
| | | | 382/167 |
| 2011/0187733 A1* | 8/2011 | Sun | G09G 3/3406 |
| | | | 345/589 |
| 2011/0316973 A1 | 12/2011 | Miller et al. | |
| 2012/0182278 A1* | 7/2012 | Ballestad | G01J 1/32 |
| | | | 345/207 |
| 2012/0256943 A1* | 10/2012 | Atkins | H04N 21/4854 |
| | | | 345/590 |
| 2014/0210847 A1 | 7/2014 | Knibbeler et al. | |
| 2015/0281711 A1 | 10/2015 | Miller et al. | |

FOREIGN PATENT DOCUMENTS

| | | |
|---|---|---|
| JP | 2000188647 | 7/2000 |
| JP | 2000188647 A | 7/2000 |
| JP | 2002092655 | 3/2002 |
| JP | 2004133400 | 4/2004 |
| JP | 2010003541 | 1/2010 |
| WO | 02/39724 | 5/2002 |
| WO | 2007/014681 | 2/2007 |
| WO | 2010/089597 | 8/2010 |
| WO | 2010/104624 | 9/2010 |
| WO | 2010/126533 | 11/2010 |
| WO | 2011/065387 | 6/2011 |
| WO | 2012/125802 | 9/2012 |
| WO | 2013/086169 | 6/2013 |

OTHER PUBLICATIONS

Notice of Allowance issued for U.S. Appl. No. 14/363,129, filed Jun. 5, 2014 in the name of Jon Scott Miller et al. Mail date: Apr. 1, 2015.
International Search Report issued for International Application No. PCT/US2012/068212 filed on Jun. 12, 2012 in the name of Dolby Laboratories Licensing Corporation. Mail date: Apr. 23, 2013.
Written Opinion issued for International Application No. PCT/US2012/068212 filed on Jun. 12, 2012 in the name of Dolby Laboratories Licensing Corporation. Mail date: Apr. 23, 2013.
International Report on Patentability issued for International Application No. PCT/US2012/068212 filed on Jun. 12, 2012 in the name of Dolby Laboratories Licensing Corporation. Mail date: Aug. 6, 2014.
Office Action issued for Japanese Patent Application No. 2014-546070. Mail date: Dec. 9, 2014. (Japanese Original + English Translation).
Kwon, O.S. et al. "High fidelity color reproduction of Plasma Displays under Ambient Lighting," IEEE Transactions on Consumer Electronics, vol. 55, No. 3, pp. 1015-1020. Aug. 2009.
Kim, M.H. "High-Fidelity Colour Reproduction for High Dynamic Range Imaging." Doctoral Thesis, UCL (University College London) 2010. Abstract Only, 1 pg.
Baba, M. et al "Novel Algorithm for LCD Backlight Dimming by Simultaneous Optimization of Backlight Luminance and Gamma Conversion Function." Proc. of the 15th International Display Workshops, Dec. 3-5, 2008. Abstract Only, 1 pg.
Liu, C.H., et al "Image Characteristic Oriented Tone Mapping for High Dynamic Range Images." IEEE International Conference on Multimedia and Expo. Jun. 23-26, 2008. pp. 1133-1136.
Barten, P.G.J. "Contrast Sensitivity of the Human Eye and its Effects on Image Quality" SPIE Optical Engineering Press, 1999. 19 pgs.
Watson, A.B. Overview of "Digital Images and Human Vision", MIT Press, Published on Oct. 20, 1993. 1 pg.
ITU-R Recommendation ITU-R BT.2020-1, "Parameter Values for Ultra-High Definition Television Systems for Production and International Programme Exchange" Jun. 2014. 8 pgs.
ITU-R Recommendation ITU-R BT.2020, "Parameter Values for Ultra-High Definition Television Systems for Production and International Programme Exchange" Aug. 2012. 7 pgs.
Daly, S. "The Visible Differences Predictor: An Algorithm for the Assessment of Image Fidelity." Chapter 14 in "Digital Images and Human Vision" ed., by A.B. Watson, MIT Press, Published on Oct. 20, 1993, pp. 180-187, 425-432.

(56) References Cited

OTHER PUBLICATIONS

Notice of Allowance issued for U.S. Appl. No. 14/735,875 filed in the name of Jon Scott Miller et al on Jun. 10, 2015. Mail date: Sep. 18, 2015.
Non-Final Office Action issued for U.S. Appl. No. 14/622,788 filed in the name of Robin Atkins et al. on Feb. 13, 2015. Mail date: May 22, 2015.
Zou, et al., "Radiometric Compensation Algorithm for Color Reproduction of Projection Display on Patterned Surface", Chinese Optics Letters, vol. 8, No. 4, Apr. 2010, pp. 388-391. Abstract Only.
Tan, R., "Segmented Logarithmic Tone Mapping from HDR to LDR" Journal of Computer Applications, vol. 28, No. 7, Jul. 2008, pp. 1724-1725.
Xiao, et al., "Tone Reproduction Method by a Local Model of Visual Adaption Based on Sigmoid Function", Guangxue Xuebao/Acta Optica Sinica, vol. 29, No. 11, Nov. 2009, pp. 3050-3056.
Ward, G., "A Contrast-Based Scalefactor for Luminance Display, Graphics Gems IV", Ed. By P.S. Heckbert, 1994, pp. 415-421.
Ferwerda, J.A., "A Model of Visual Adaptation for Realistic Image Synthesis", Computer Graphics, 1996, pp. 249-258.
Notice of Allowance issued for U.S. Appl. No. 14/622,788 filed in the name of Robin Atkins et al. on Feb. 13, 2015. Mail date: Sep. 29, 2015.
Restriction Requirement issued for U.S. Appl. No. 13/626,430, filed Sep. 25, 2012 in the name of Robin Atkins et al. Mail date: Feb. 13, 2014.
Non-Final Office Action issued for U.S. Appl. No. 13/626,430, filed Sep. 25, 2012 in the name of Robin Atkins et al. Mail date: May 9, 2014.
Final Office Action issued for U.S. Appl. No. 13/626,430, filed Sep. 25, 2012 in the name of Robin Atkins et al. Mail date: Dec. 31, 2014.
Notice of Allowance issued for U.S. Appl. No. 13/626,430, filed Sep. 25, 2012 in the name of Robin Atkins et al. Mail date: Feb. 2, 2015.
Non-Final Office Action for U.S. Appl. No. 14/925,596, filed Oct. 28, 2015 on behalf of Jon Scott Miller. Mail Date: Feb. 16, 2016. 13 pages.

* cited by examiner

IMAGE FORMATS AND RELATED METHODS AND APPARATUSES

CROSS-REFERENCE TO RELATED APPLICATION

This application is a continuation of U.S. patent application Ser. No. 14/622,788, filed on Feb. 13, 2015, which, in turn, is a continuation of U.S. patent application Ser. No. 13/626,430, entitled "Image Formats and Related Methods and Apparatuses", filed on Sep. 25, 2012 and issued as U.S. Pat. No. 8,988,552 on Mar. 24, 2015; which, in turn, claims priority to U.S. Provisional Application No. 61/539,438, entitled "Image Formats and Related Methods and Apparatuses" and filed on Sep. 26, 2011. The entirety of each of the foregoing patents, patent applications, and patent application publications is incorporated by reference herein.

TECHNICAL FIELD OF THE INVENTION

The invention relates to the media industry and has application in delivery of image content such as video and/or still images to consumers who view the images on displays such as televisions, digital cinema displays, media viewers and the like. The invention has particular application to formats for transmission of image data, displays, and methods for encoding, decoding and/or displaying image data.

BACKGROUND OF THE INVENTION

Video content is typically prepared and distributed by way of a combination of systems and technologies that may be termed a "video delivery pipeline". FIG. 1 is a flowchart of a conventional video delivery pipeline 100 showing various stages from video capture to video content display. A sequence of video frames 101 is captured at block 102. Video frames 101 may be digitally captured (e.g. by a digital camera) or generated by a computer (e.g. using computer animation) to provide video data 103. Alternately, video frames 101 may be captured on film by a film camera. The film is converted to a digital format to provide video data 103. In a production phase 104 video data 103 is edited to provide a video production 105.

Video data of production 105 is provided to a processor at block 106 for post-production editing. Block 106 post-production editing may include adjusting or modifying colors or brightness in particular areas of an image to enhance the image quality or achieve a particular appearance for the image in accordance with the video creator's creative intent. This is sometimes called "color timing". Other editing (e.g. scene selection and sequencing, image cropping, addition of computer-generated visual special effects, etc.) may be performed at block 106 to yield a final version 107 of the production for distribution. During block 106 post-production editing, video images are viewed on a reference display 108. In block 106 the final production 107 is viewed on reference display 108 or another reference display for approval. It is not mandatory that the same display be used for color timing and approval.

Following post-production, video data of final production 107 is delivered at block 116 to a display subsystem 120. As seen in FIG. 1A, block 116 delivery includes an encoder stage 117A which generates encoded video data 118 embodying the content of video data 107 to be distributed by way of a video distribution medium 115 (e.g. satellite, cable, DVD, wireless communication link, internet, local area network, broadcast, etc.). A decoder stage 117B is located downstream from encoder stage 117A to decode video data 118 transmitted over medium 115.

Display subsystem 120 may perform video processing 120A and displaying 120B. Video processor 120A may be integrated with displaying 120B or may be separate. At block 120A, video data 118 is provided to a video processor for processing and/or decoding. Video data 118 is output to a display 122 at block 120B to display a sequence of images to a viewer.

Encoded video data 118 may have a format selected with reference to properties of medium 115 (for example to fit within bandwidth requirements and/or format requirements of medium 115). To improve the quality of displayed images, encoded video data 118 may be driven through video delivery pipeline 100 at a relatively high bit rate so as to facilitate an increased bit depth for defining RGB or chroma values for each chrominance (color) channel. For example, video data 118 may comprise 8, 10 or 12 bits of data for each color channel of a pixel. The video data may be compressed.

Despite using a high bit depth for each chrominance channel, variations in display characteristics (such as luminance range, gamut, etc.) may affect the appearance of an image rendered on a display so that the image rendered does not match the creative intent of the video's creator. In particular, the perceived color or brightness of an image rendered on a particular display subsystem may differ from the color or brightness of the image as viewed on reference display 108 during post-production block 106.

The same video content 107 may be displayed on any of a wide variety of different types of electronic displays including televisions, computer displays, special purpose displays such as medical imaging displays or virtual reality displays, video game displays, advertising displays, displays on cellular telephones, tablets, media player displays, displays in hand-held devices, displays used on control panels for equipment of different kinds and the like. Displays may employ any of a wide range of technologies. Some non-limiting examples are plasma displays, liquid crystal displays (LCDs), cathode ray tube (CRT) displays, organic light emitting diode (OLED) displays, projection displays that use any of various light sources in combination with various spatial light modulation technologies, and so on.

Different displays may vary significantly with respect to features such as:
 the color gamut that can be reproduced by the display;
 the maximum brightness achievable;
 contrast ratio;
 resolution;
 acceptable input signal formats;
 color depth;
 white level;
 black level;
 white point;
 and grey steps.

Consequently, the same image content may appear different when played back on different displays. Image content that matches a creator's creative intent when displayed on some displays may depart from the creator's creative intent in one or more ways when viewed on other displays. The appearance of displayed images is also affected by the environment in which a display is being viewed. For example, the luminance of ambient lighting, the color of ambient lighting and screen reflections can all affect the appearance of displayed images.

With the increasing availability of high-performance displays (e.g. displays that have high peak luminance and/or broad color gamut) comes the problem of how to adjust images for optimum viewing on a particular display or type of displays. Addressing this problem in simplistic ways can result in noticeable artifacts in displayed images. For example, consider the case where an image that appears properly on a display having a moderate peak luminance is displayed on a target display having a very high peak luminance. If one expands the luminance range of the image data to take advantage of the high peak luminance of the target display, the result may be poor due to objectionable artifacts that are rendered apparent by the range expansion. Artifacts may include, for example, one or more of banding, quantization artifacts, visible macroblock edges, objectionable film grain and the like. On the other hand, if the image is displayed on the target display without range expansion, no benefit is gained from the high peak luminance that the target display can achieve.

Video formats used in many current imaging systems (e.g. HDTV, UHDTV) are based on defining black and white levels with a power response. This makes it very difficult to ensure consistent mid-tones, contrast, and color when video content derived from the same video data 107 is viewed on different displays.

The system pipeline response can be represented by an end-to-end transfer function that compares an image on a reference display and the same image displayed on a target display. Makers of displays typically make assumptions about the response of the reference display (and environment) in which images were approved. Displays may process image data in various ways (e.g. applying a power function response, making color saturation adjustments, adjusting brightness adjustment, adjusting contrast etc.) to arrive at an image that the display maker thinks will be best appreciated by viewers.

For accurate reproduction of video images, video distribution systems of the type illustrated in FIGS. 1 and 1A typically require that the system response of the pipeline be tailored to match characteristics of the reference display on which the content was approved and/or color graded. Display makers can attempt to provide image processing that achieves a desired system response, for example by defining a response curve between a minimum and maximum luminance. The minimum and maximum luminance may be implied from assumed capabilities of a reference display. Displays that perform image processing based on wrong assumptions regarding the characteristics of a reference display on which the image data was approved or color graded may produce images that are not faithful to the image as approved by its creator. For example different interpretations of the same video signal can result in inconsistent mid-tones, and other characteristics of images displayed on different displays.

Another issue with video distribution systems of the type illustrated in FIGS. 1 and 1A is that changing to a different reference display or altering the configuration of the reference display or its viewing environment can require changes to the system response of the pipeline if one wishes to ensure that viewers have the highest quality viewing experience. One approach to dealing with this issue is to provide metadata along with video data 118. The metadata can specify the source gamut. The target displays may then be made to adapt themselves by providing image processing selected based on the metadata to achieve the desired system response. This adds complexity and is prone to failure for some distribution channels (e.g. broadcast).

There is a general desire for systems, apparatus and methods for generating, delivering, processing and displaying video data to preserve the content creator's creative intent. There is a general desire for systems, apparatus and methods for providing information which may be used to guide downstream processing and/or display of video data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

SUMMARY OF THE INVENTION

This invention has several aspects. These include methods for displaying digital images, methods for preparing digital images for distribution, video delivery pipelines and their respective components.

One aspect of the invention provides image data encoding methods which fix mid-tones of both reference and target displays to a common response and allow highlights and shadows to be extended and/or compressed based on the capabilities of the target display. The result is an imaging system in which image processing at the target display can be performed depending only on characteristics of the target display or characteristics of the target display and its environment (and does not need to be based on characteristics of the image source). In some embodiments image data is assigned to image values represented by image data according to a sigmoidal response curve. The same sigmoidal response curve may be used in the reference display used in creation and/or approval of the source content.

Another aspect of the invention provides image data encoding methods in which the sizes of the steps between levels in which luminance is encoded increase more slowly and/or become smaller as luminance increases above a mid-tone range and/or decreases below the mid-tone range.

Another aspect of the invention provides methods for encoding image data. The methods comprise processing image data to provide image values corresponding to quantized luminance steps wherein a step size between the quantized luminance steps is smaller in a highlight region than in a mid-tone region.

Another aspect of the invention provides methods for displaying images (which may be still or video images) on a target display. The methods comprise processing image data that has been reviewed on a reference display and encoded such that a predetermined image value of the image data corresponds to a predetermined mid-tone value displayed on the reference display. The processing comprising applying a mapping to the image data that maps the predetermined image value to the predetermined mid-tone value when viewed on the target display. In certain embodiments the mapping provides a log-linear mid-tone region having a slope n that matches or approximates a slope of a corresponding mid-tone region of a response function of the reference display. In an example embodiment the mapping is specified by a sigmoidal function. An example sigmoidal mapping function is given by the equation:

$$L_{OUT} = \frac{c_1 + c_2 L_{IN}^n}{1 + c_3 L_{IN}^n}$$

which is discussed below.

Some embodiments involve adjusting the mapping in response to ambient lighting. The adjusting may, for example, comprise one or more of: increasing the mid-tone value to which the predetermined image value is mapped in response to an increase in the ambient lighting; and decreasing mid-tone contrast of the mapping function.

Some embodiments comprise modeling the effect of the ambient lighting on light adaptation of the human visual system to obtain an estimated adaptation and adjusting the mapping based on the estimated adaptation. Modeling the effect of the ambient lighting on the adaptation of the human visual system may optionally comprise modeling a plurality of adaptation aspects to obtain a corresponding plurality of estimated adaptations. In such cases the method may comprise adjusting different characteristics of the mappings based on different ones of the estimated adaptations. For example, adjusting the mapping may comprise one or more of: controlling a luminance to which the predetermined image value is mapped based at least in part on an estimate of a general brightness adaptation; controlling mid-range contrast based at least in part on an estimate of lateral brightness adaptation; and controlling contrast in highlight and shadow regions based at least in part on an estimate of local brightness adaptation.

In cases where the target display has a greater peak luminance than the reference display the method may comprise applying a mapping configured to expand the luminance corresponding to image values corresponding to a highlight region above the mid-tone region. In cases where the target display has a lower black level than the reference display the method may comprise applying a mapping configured to expand the luminance corresponding to image values corresponding to a shadow region below the mid-tone region.

Another aspect of the invention provides cameras and other image capture devices that map detected light to output image values according to a response function. In some embodiments the response function is a sigmoidal function. An example image capture device according to this aspect comprises a light-sensing array operable to detect light and a mapping unit connected to represent intensity of light sensed by elements of the light-sensing array as digital image values according to a response function. An exposure compensation mechanism is connected to control the mapping unit such that a fixed point in the mid-range of the response function is made to correspond to a midpoint of the output image values. In some embodiments the response function is given by the equation:

$$L_{OUT} = \frac{c_1 + c_2 L_{IN}^n}{1 + c_3 L_{IN}^n}$$

and the exposure compensation mechanism controls the value of one or both of $n$ and $c_2$ based at least in part on a measured exposure.

Other example aspects of the invention provide displays and image processing apparatus.

Further aspects of the invention and features of specific embodiments of the invention are described below.

BRIEF DESCRIPTION OF THE DRAWINGS

The accompanying drawings illustrate non-limiting example embodiments of the invention.

DESCRIPTION OF THE INVENTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Luminance and other values in image data ("image values") are typically gamma encoded. Simple gamma encoding involves applying a power law to image data, for example according to:

$$T_{OUT} = A T_{IN}^\gamma$$

where $T_{IN}$ is the input value for luminance or other image value, $T_{OUT}$ is the output value for the luminance or other image value, A is a constant (typically 1) and y is the gamma value. Images are typically encoded with values for y that are less than one (for example, about 0.45). When gamma-encoded images are displayed, the display process applies a gamma expansion (gamma value larger than 1—for example 2.2 or 2.4) which results in a desired image being displayed.

Figure 1:
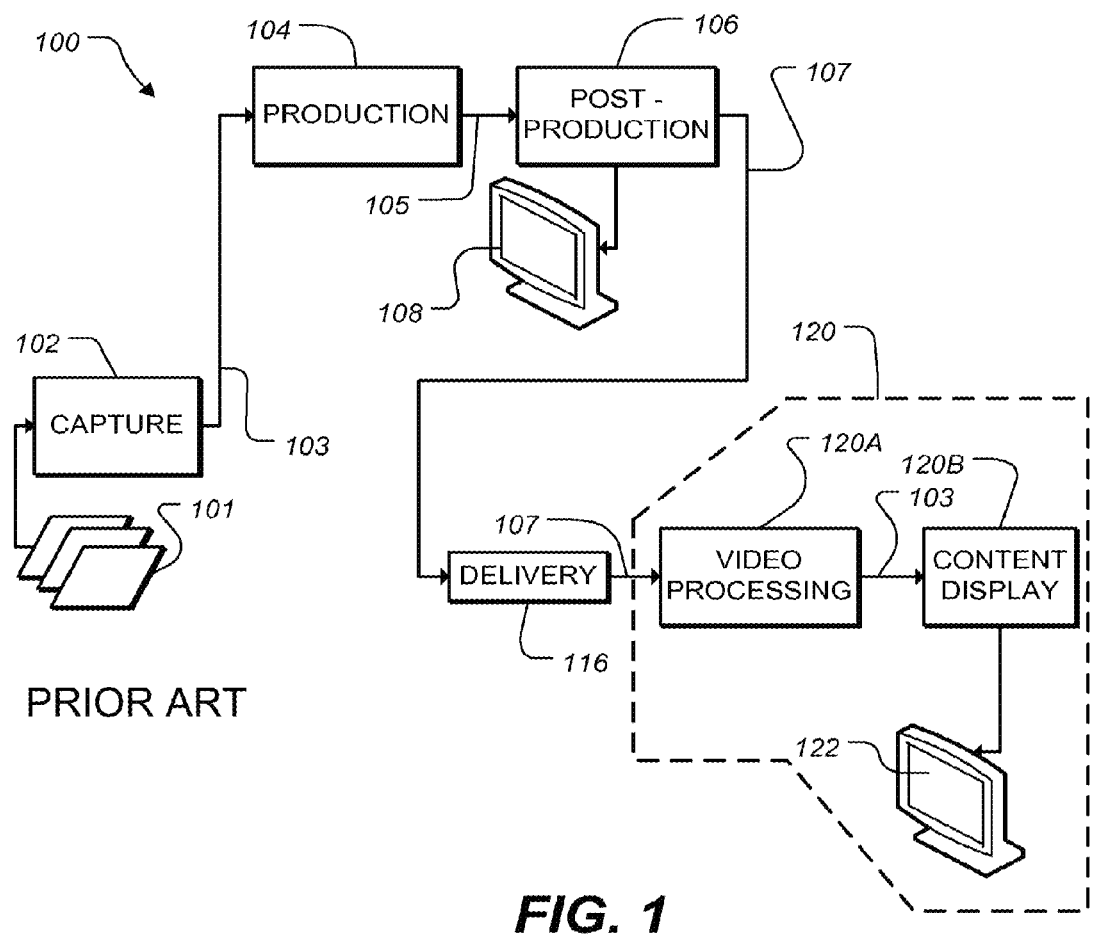
FIG. 1 is a block diagram of a video distribution pipeline.
Figure 1A:
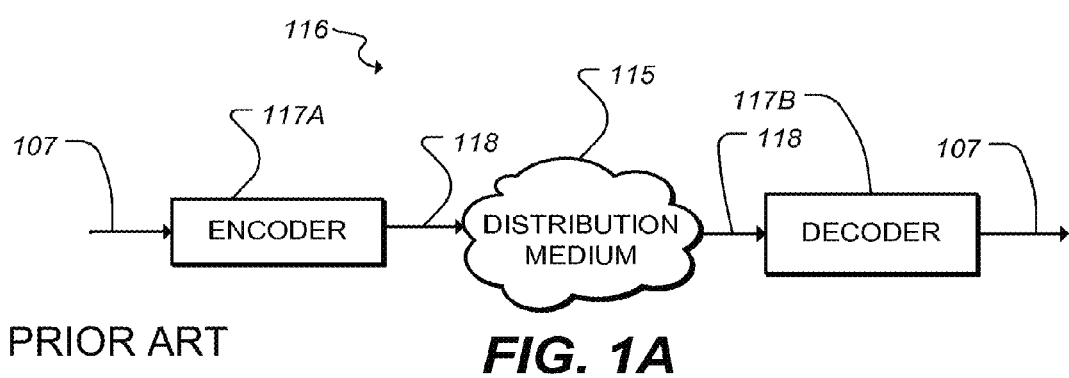
FIG. 1A is a block diagram illustrating distribution of image content over a distribution medium.
Figure 2:
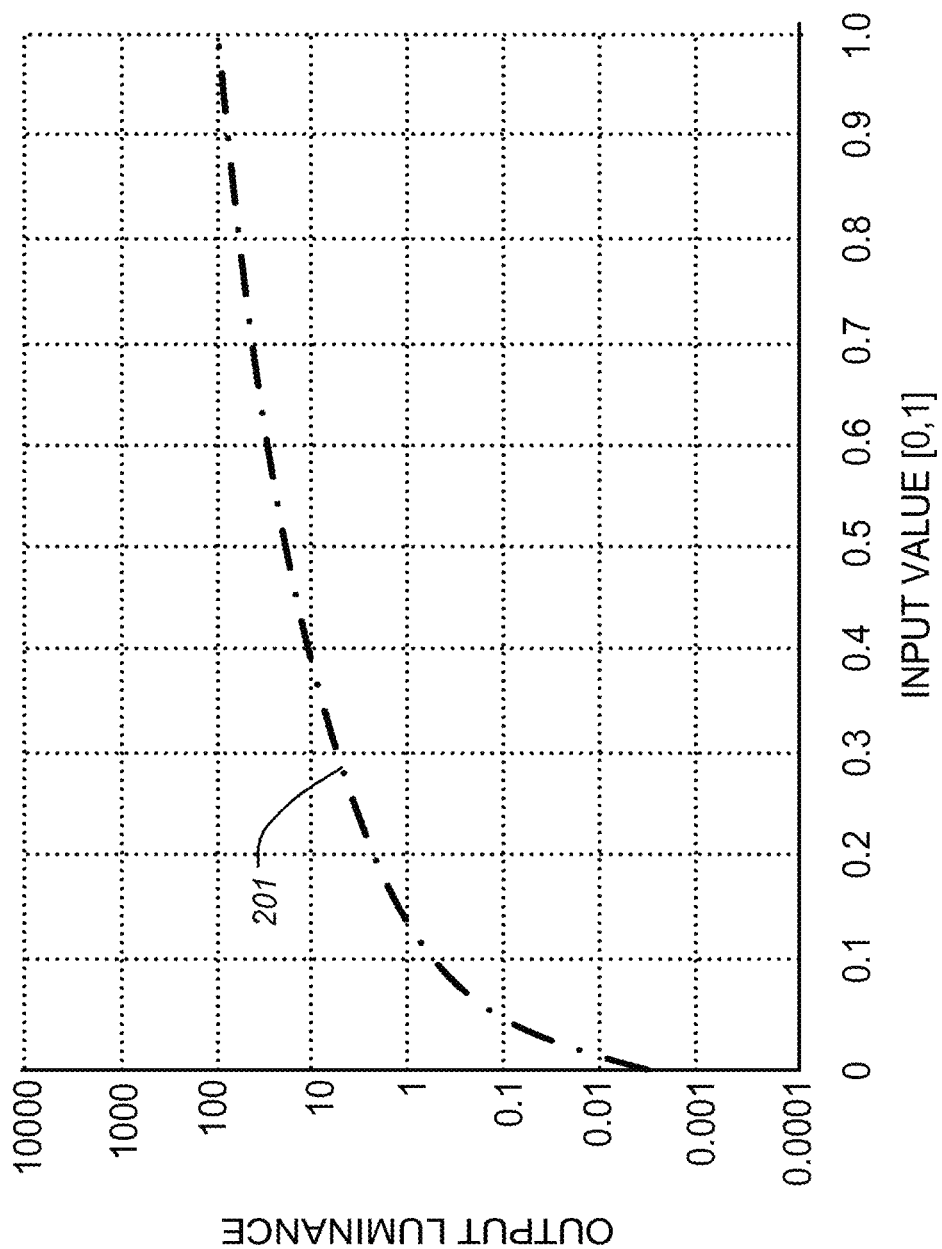
FIG. 2 is a graph which illustrates a possible gamma-based response curve for a reference display.
Figure 2A:
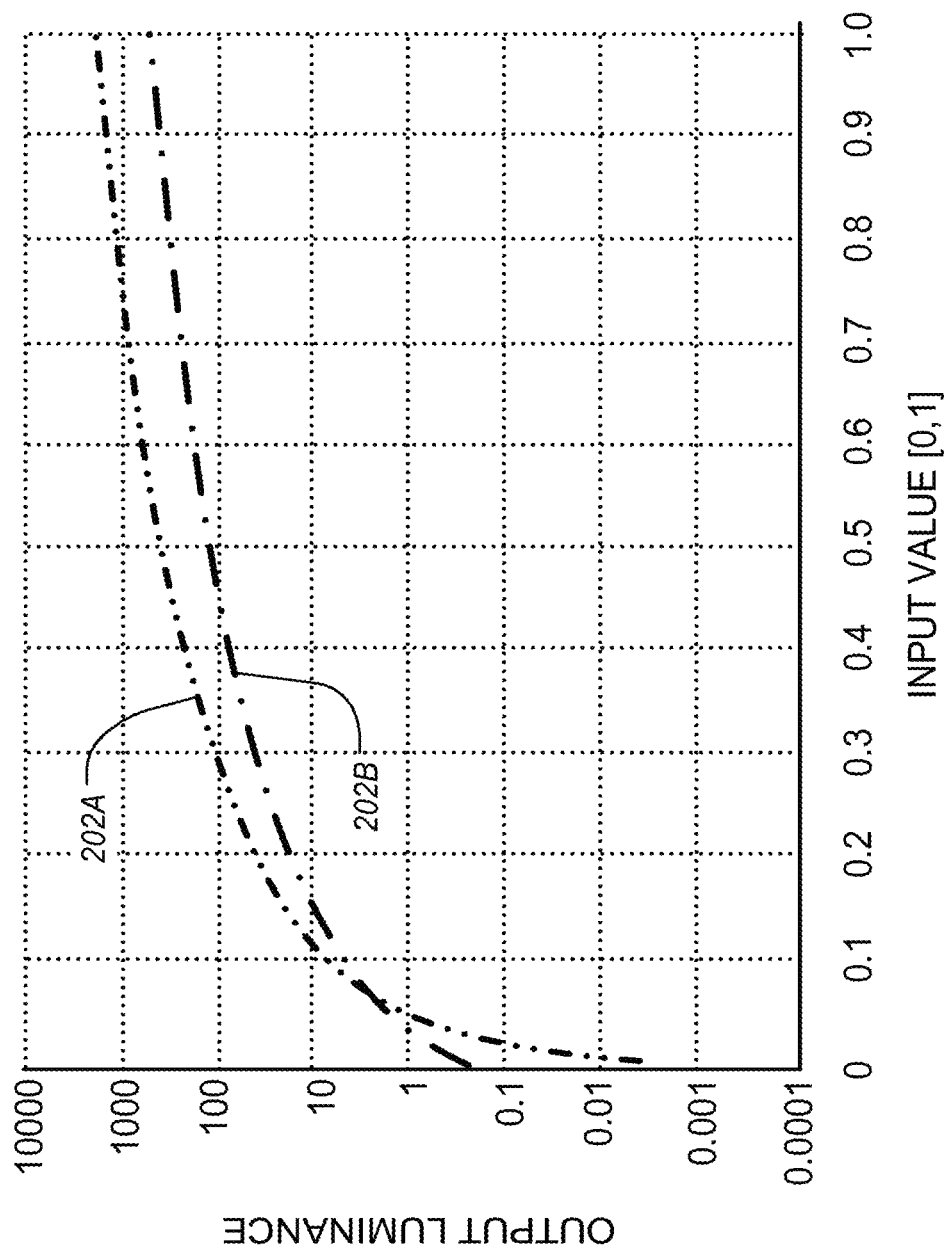
FIG. 2A is a graph which illustrates possible response curves for two different example target displays.

To date, standard dynamic range (SDR) reference displays have power function response characteristics. The inventors have determined that this response does not preserve end-to-end system luminance levels when content is shown on displays having luminance ranges different from that of the reference display. This distorts image appearance. FIG. 2 shows a generalized example response curve 201 for an example reference display. FIG. 2A shows example response curves 202A and 202B for two different target displays. All three displays have the same gamma (2.4 in this example) but the target displays have higher peak luminance than the reference display and the target display corresponding to curve 202B has a higher black level than the reference display.

Figure 2B:
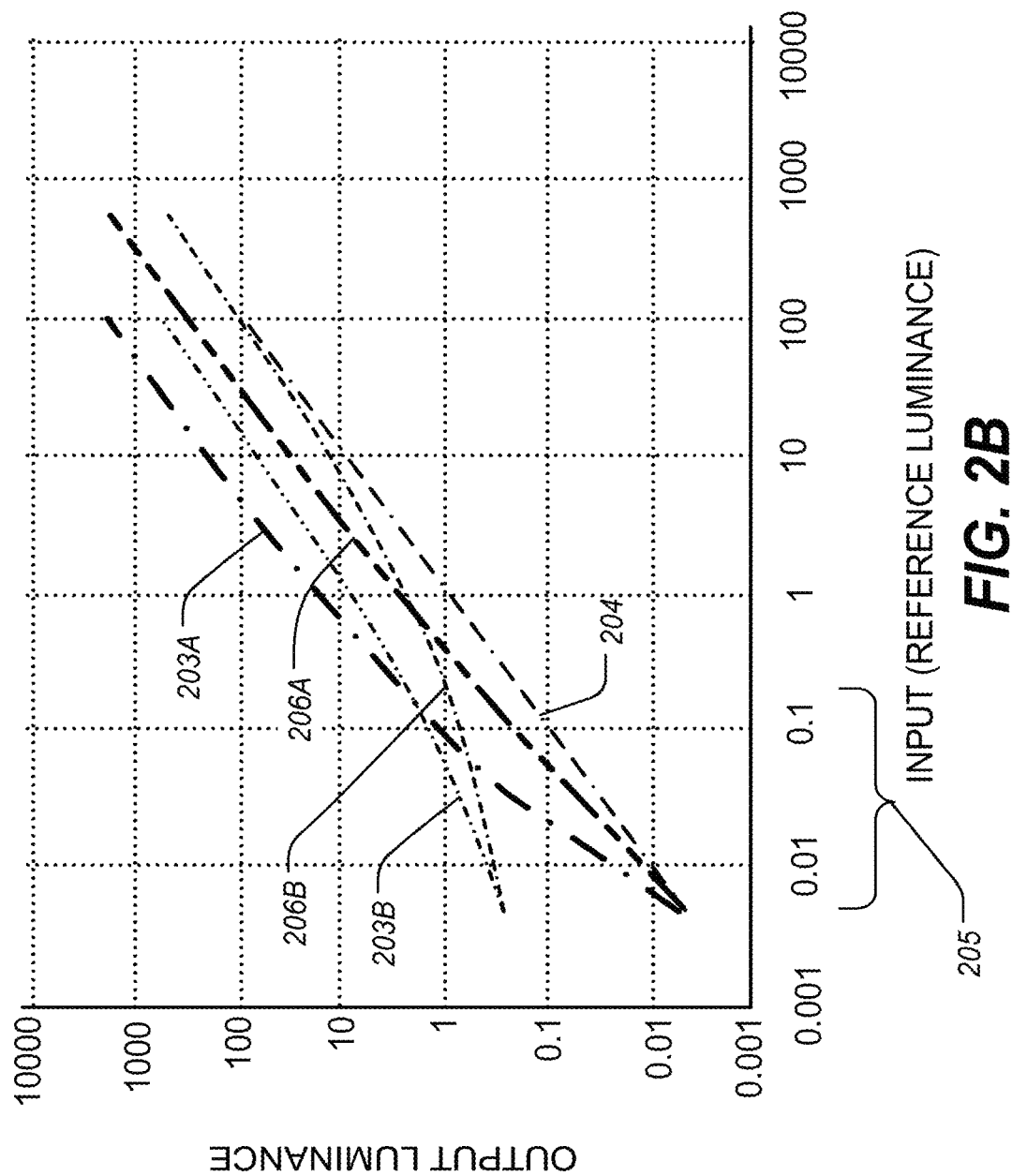
FIG. 2B is a graph which illustrates system response curves for the case where video data approved on a display having a response as shown in FIG. 2 is displayed on two different target displays having the response functions of FIG. 2A.

FIG. 2B shows the resulting system response curves 203A and 203B for images respectively viewed on the two example target displays having response curves 202A and 202B. For a perfect match of appearance (the image would appear the same on the target display as on the reference display) luminance levels would fall on dashed line 204. However, since both target displays have a higher peak luminance than the reference display, the output levels far exceed the intent. If the visual systems of viewers viewing the target displays are adapted to the same ambient lighting conditions as for the reference display, the result would be an image which appeared much brighter than intended. Also, system responses 203A and 203B are altered near black. Response curve 203A is substantially steeper in the dark region 205 than the ideal response curve 204. This has the effect of stretching levels apart, or increasing contrast, further distorting the creative intent.

Curves 206A and 206B in FIG. 2B are response curves for the case where the reference display has a higher peak luminance (e.g. 600 nits as opposed to 100 nits) but with the same gamma=2.4 response. These curves show how the system response curves change drastically throughout the entire range depending on the characteristics of the reference display, indicating that appearance is dependent on the characteristics of the reference monitor. FIGS. 2 through 2B demonstrate that mismatch between the capabilities of the reference and target displays in a gamma-based system result in appearance not being preserved through the video pipeline. This can degrade the viewing experience.

The inventors have determined that at least some of the problems with the prior art approach described above arise because values in encoded video data do not correspond to specific luminance values but instead to values determined with reference to the ranges of the displays on which they are displayed. This is a special problem with mid-range values (e.g. values in the range of about 0.1 nits to 100 nits in a dim viewing environment). Pixels have mid-range values in the most salient portions of most images. This issue may be addressed by providing image data formats and systems in which mid-range values are consistently mapped into the same range.

Figure 3:
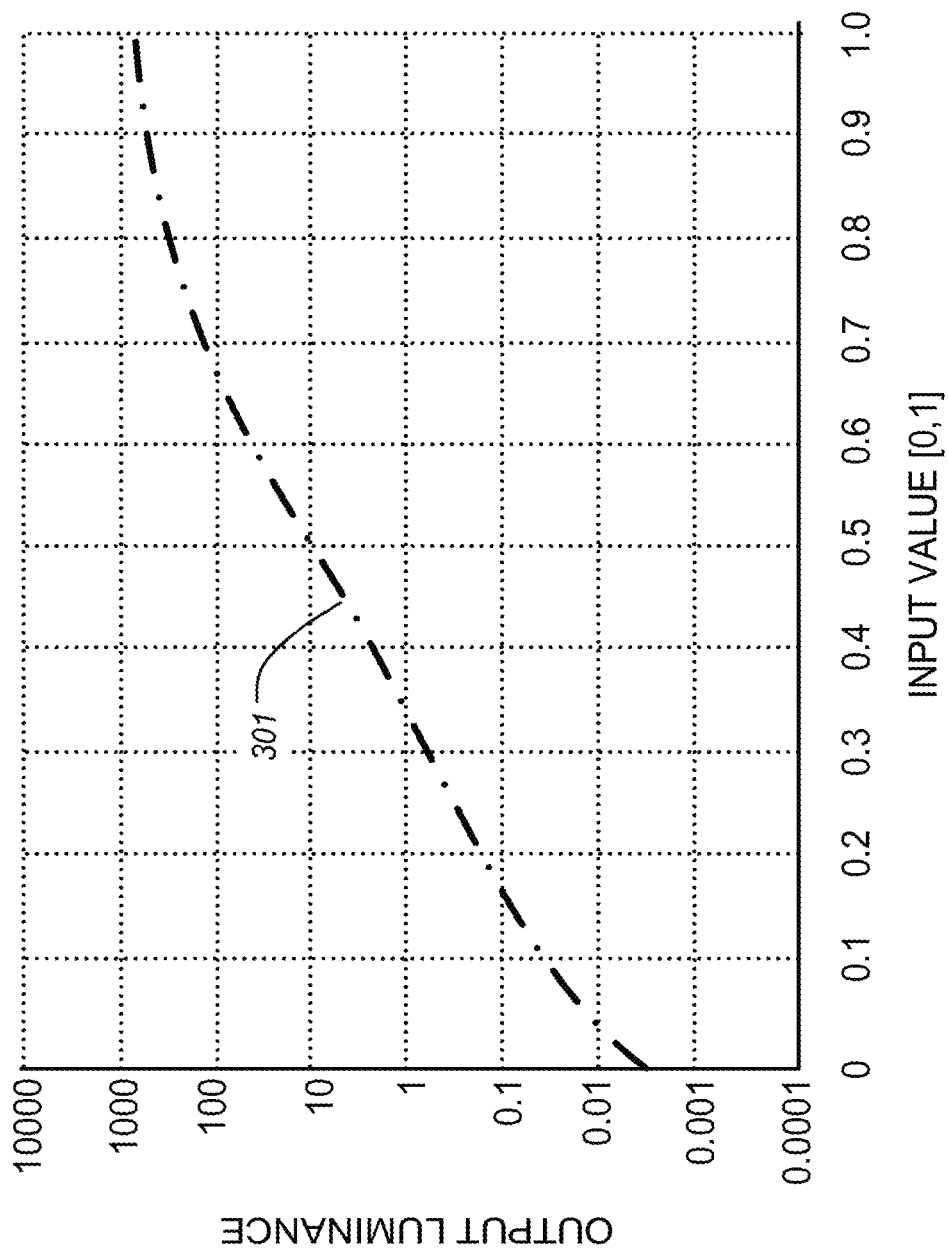
FIG. 3 shows a response curve for an example reference display.
Figure 3A:
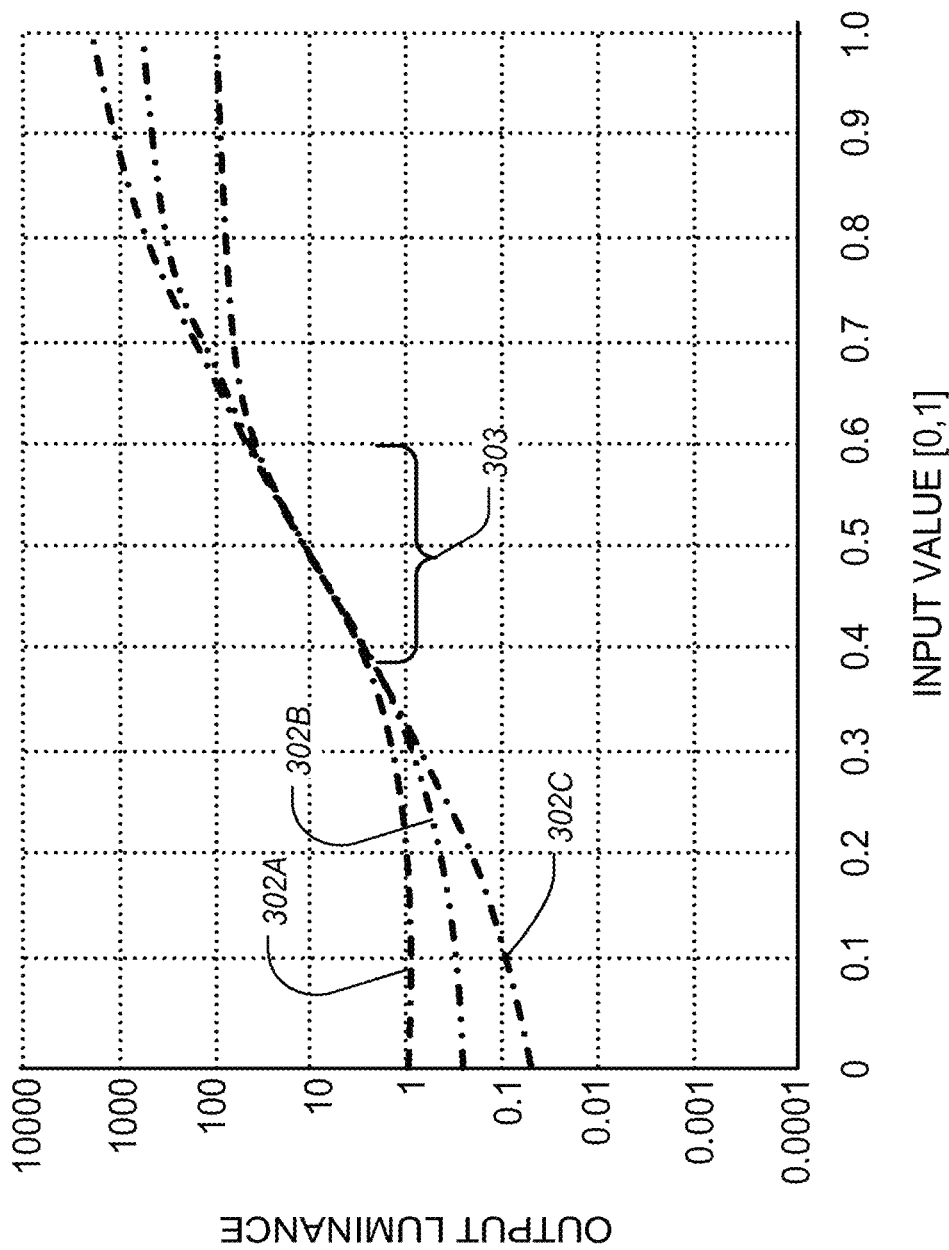
FIG. 3A shows response curves corresponding to three example target displays.

One way to achieve this is illustrated in FIGS. 3 and 3A. These figures illustrate response curves for a number of displays that are constructed such that mid-range values in image data are consistently mapped into the same luminance range. In these example curves, values outside of the mid-range are compressed or expanded smoothly and gently into the range of the display. FIG. 3 shows a response curve 301 corresponding to an example reference display. FIG. 3A shows response curves 302A, 302B, and 302C corresponding to three example target displays. In each case, for image values in a mid-range region 303 the mappings of image values to luminance is essentially the same.

A feature of response curve 301 is that for higher image values the luminances increase relatively slowly with increasing values (the luminances increase in relatively small steps). This results in redundant precision at such higher values (since the human visual system cannot distinguish between luminances that differ by less than a threshold amount). This, in turn, facilitates expansion of the luminance corresponding to higher image values without creating perceptible quantization artifacts such as banding and the like that can result when expansion causes adjacent image values to correspond to noticeably different luminance levels.

In some embodiments, response curve 301 is such that the difference in luminance specified by adjacent levels is smaller than a just noticeable difference (JND) at least in the portion of response curve 301 toward higher luminance values (for example, at least in the right hand ¼ of curve 301). There are various ways to quantify the JND. A simple way to quantify JND is Weber's ratio which can be given by:

$$R = \frac{\Delta L}{L}$$

where $\Delta L$ is the luminance step size and L is the background luminance level. One estimate of the JND is that the JND corresponds to a Weber's ratio of 1%. In some embodiments, the response function 301 for a reference display is such that the difference in luminance specified by adjacent image values is less than ½, ⅕ or 1/10 of a JND. This permits expansion of the luminance range by a factor of up to 2, 5 or 10 while preserving the desirable quality that the difference in luminance specified by adjacent quantized image values does not exceed a JND. For example, adjacent image values may correspond to adjacent luminances for which the Weber's ratio is less than 0.005, 0.002 or 0.001. In other embodiments another estimate of JND is applied. for example, as described in G. Ward, *A Contrast-Based Scalefactor for Luminance Display*, Graphics Gems IV, Ed. by P. S. Heckbert, pp. 415-421, 1994 or J. A. Ferwerda, et al. *A Model of Visual Adaptation for Realistic Image Synthesis*, Computer Graphics, pp. 249-258, 1996. In such cases, the response curve 301 for a reference display may be such that the difference in luminance specified by adjacent image values is less than ½, ⅕ or 1/10 of a JND to provide for the possibility of a desired range of expansion without causing artifacts which result from adjacent quantized luminance values differing by significantly more than a JND when displayed on a target display.

In the embodiment illustrated in FIGS. 3 and 3A the response functions of the reference and target displays are all sigmoidal functions. In each case, the sigmoidal function comprises parameters that allow a fixed point to be set. The fixed point is a point corresponding to a specific mid-range image value and a specific corresponding luminance value. The sigmoidal function also has one or more parameters that allow control over the slope of the response function in a mid-range region that includes the fixed point. These parameters can be set so that the response functions for the reference and target displays all pass through the fixed point and all have the same slope in a mid-range region.

The sigmoidal response functions may differ in the ends of the range of image values. This flexibility allows the ends of the response functions to be arranged to extend to the display's capabilities. In this illustrated example embodiment, on all displays the input image values are in a range of zero to one. In each case, the input image value 0.5 maps to 10 nits with the same mid-range slope (contrast). The ends of each response function smoothly roll off according to the display's capabilities.

The response functions of target displays may be specified as a standard. For example, a sigmoidal response may be specified in such a manner that the shape of the response curve is specified by parameters that specify a minimum, a maximum, a mid-range value and a mid-range slope (or contrast). The standard may specify the mid-range value and a mid-range slope. The reference display and target displays may all use response curves characterized by the same mid-range value and a mid-range slope. Different target displays may use different maximum and minimum values. The response curves in the target displays may smoothly roll off to the maximum and minimum values.

A specification does not necessarily fix a mid-point in an absolute sense. As an alternative, a specification could specify a rule for determining the mid-point based on capabilities of the target display. For example the mid-point may be specified based on a geometric mean luminance of the target display. In an example, the mid-point may be set for a target display by determining an intermediate value Lat' according to:

$$L_{at'} = A\sqrt{L_{min} \cdot L_{max}}$$

where Lmin and Lmax are the extremes of the range of the target display and A is a constant and then determining the mid-point for the target display according to:

$$L_{at} = \sqrt{L_{as} \cdot L_{at'}}$$

where Las is a predetermined midpoint (e.g. 10 nits) and Lat is the mid-point to be used for the target display.

Similarly, mid-range contrast need not be specified as a fixed value but could, in some embodiments, be based in part on capabilities of a target display. For example, mid-range contrast could be based on a value n' determined according to:

$$n' = \frac{1}{2}\log_{10}\left(\frac{L_{max}}{L_{at}}\right)$$

the mid-range slope, n, for the response curve of the target display may then be given by:

$$n = \sqrt{n_s \cdot n'}$$

where ns is a specified standard slope.

Roll off of the response functions for a reference or target display at high image values may be determined based on the peak luminance of the display. A display with 120 nit peak luminance will have a much more shallow rolloff than a display with 1200 peak luminance. The exact slope at any point in the roll off region for a reference display is not too important from the point of view of a colorist as the colorist will compensate for it during mapping.

Figure 3B:
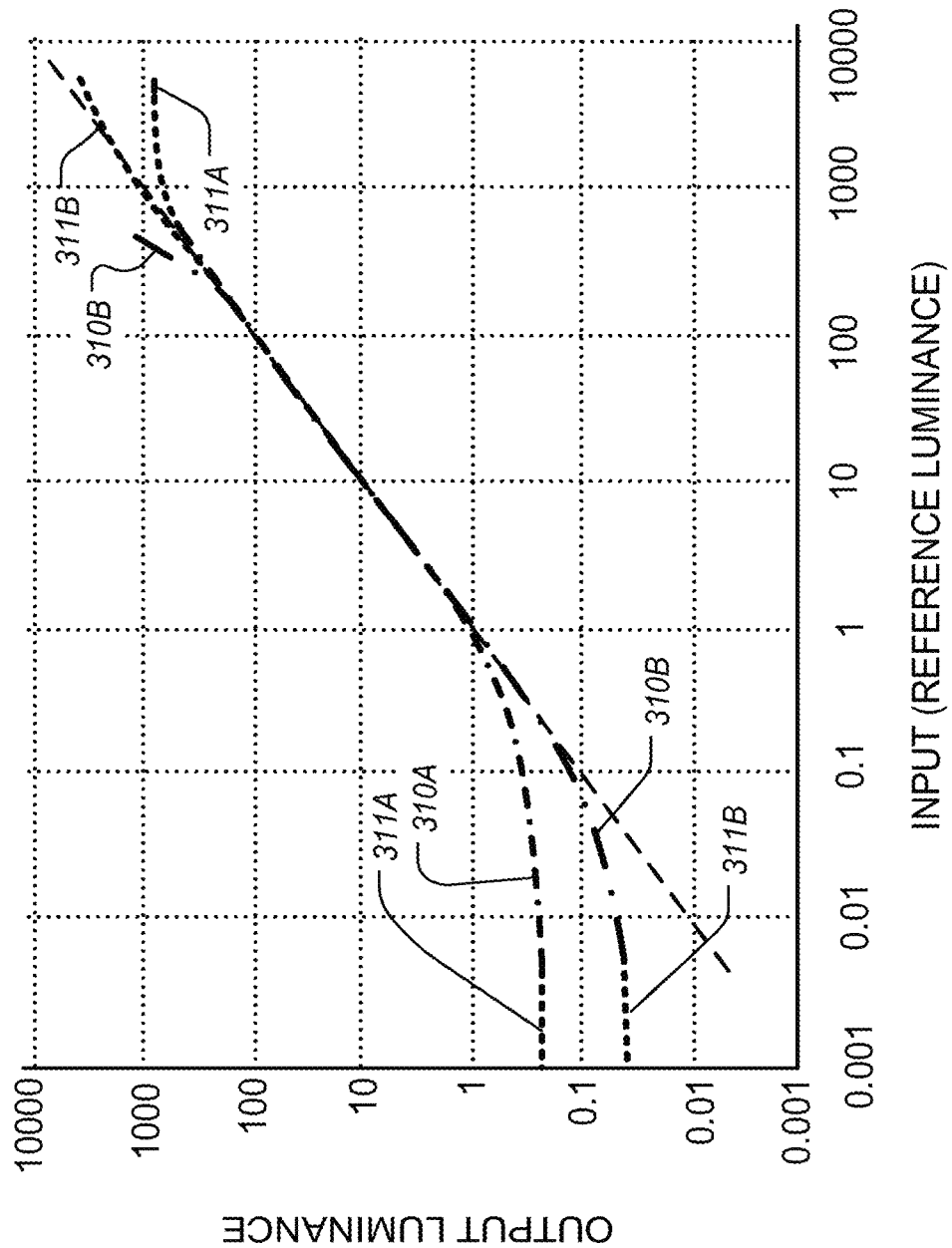
FIG. 3B shows curves representing a system response for different combinations of two different target displays and two different reference displays having different peak luminance.

FIG. 3B shows curves 310A and 310B representing the system response for two different target displays for the case where the reference display has a maximum luminance of 600 nits and curves 311A and 311B for the case where the reference display has a maximum luminance of 5000 nits. It can be seen that the mid-range is not affected by these changes and the system response in the mid-range is consistent across the target displays. The top and bottom ends of the system response functions stretch to exploit the capabilities of the target displays.

In an example embodiment, the response curves for the displays are given by:

$$L_{OUT} = \frac{c_1 + c_2 L_{IN}^n}{1 + c_3 L_{IN}^n}$$

where $L_{IN}$ is the input value for luminance or other image value. For example, $L_{IN}$ may be a luminance in a range [$min_s$, $max_s$] where $min_s$ and $max_s$ are respectively standard minimum and maximum values. $L_{out}$ is the output value for the luminance or other image value, $c_1$, $c_2$ and $c_3$ and n are parameters. Here, the value of n sets the mid-range contrast and the location of the mid-range fixed point is determined primarily by the value of $c_2$. The parameters $c_1$ and $c_3$ may be used to tune the response function to exploit the full dynamic range of a display.

The image values present in image data may be further encoded. In an example embodiment, the image values represent the logarithms of luminance levels. In an example of such a case, $L_{IN}$ may be given in the range of [0.001, 1000] by:

$$L_{IN} = 10^{(6V-3)}$$

where V is a normalized image value in the range of zero to one.

As noted above, response functions may be determined with reference to a standard range [$min_s$, $max_s$]. It is possible to select the standard range to provide some degree of backward compatibility with video signals that are gamma encoded. For example, video data represented using a sigmoidal response function as defined above can be made to display nearly correctly on existing displays which assume standard gamma-encoded video input by appropriate selection of the standard mid-point, standard mid-range slope and standard range. For example, selecting [$min_s$, $max_s$] to be [0.005, 120] with suitable choices for ns and Las can yield a video signal that can be viewed on typical televisions with acceptable results.

Figure 4:
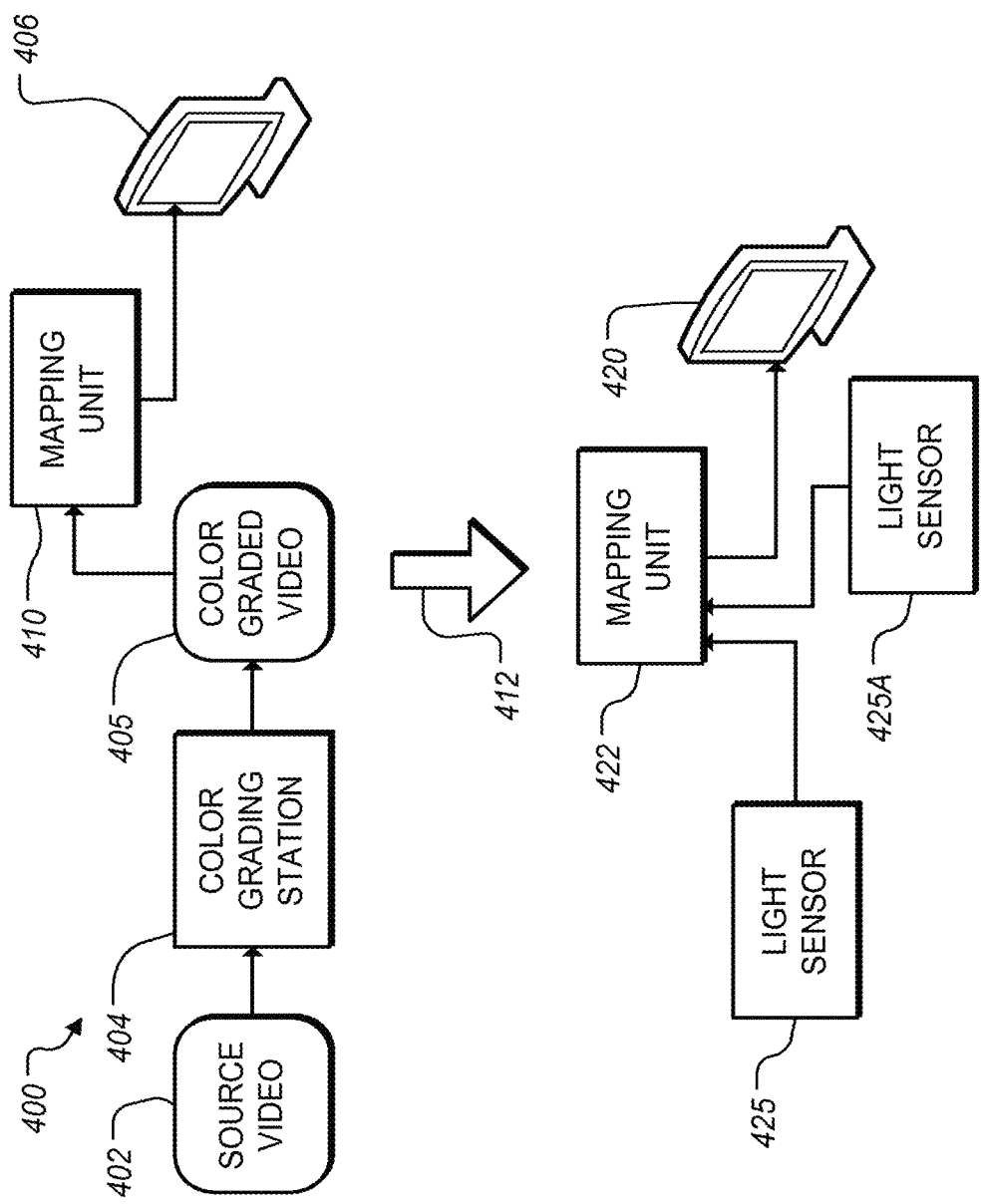
FIG. 4 is a block diagram for an example video delivery pipeline.

Response functions having properties like that of the example response function of Equation (2) may be applied in various ways to provide media delivery pipelines. One example video delivery pipeline 400 is illustrated in FIG. 4. Pipeline 400 processes and distributes video content based on source video 402. A color grading station 404 includes a reference display 406. A mapping unit 410 maps color graded video 405 to be viewed on reference display 406. Mapping unit 410 may, for example, implement a mapping function of the type illustrated by Equation (2). Mapping unit 410 may be a stand-alone device or may be integrated with reference display 406, color grading station 404, some other device, or a combination of these.

A color grader can use controls of color grading station 404 to adjust image values from source video 402 to yield color graded video 405. The color grader can view color graded video 405 on reference display 406 and continue to make adjustments to color graded video 405 using controls provided by color grading station 404 until the color graded video 405—as mapped by mapping unit 410—has a desired appearance when viewed on reference display 406.

Color graded video 405 may then be distributed over a distribution channel 412 for viewing on one or more target displays 420. The color graded video 405 may be suitably encoded and decoded in distribution channel 412. In some embodiments the color graded video 405 is quantized, encoded and represented in a data format apropos to the particular distribution channel 412 being used. In some embodiments color graded video 405 is formatted according to a VDR (visual dynamic range) format in distribution channel 412. VDR format is a video format described in commonly assigned PCT Application No. PCT/US2010/022700 entitled "EXTENDED DYNAMIC RANGE AND EXTENDED DIMENSIONALITY IMAGE SIGNAL CONVERSION AND/OR DELIVERY VIA LEGACY VIDEO INTERFACES" which is hereby incorporated herein by reference for all purposes.

Each target display 420 is associated with a mapping unit 422 that maps color graded video 405 for display on the target display 420. Mapping units 422 may be integrated with target displays 420 or a suitable mapping unit 422 may be otherwise provided upstream from each target displays 420.

Mapping units 422 do not require information such as a reference gamut or environmental conditions regarding reference display 406 because the mappings performed by mapping units 410 and 422 have a common fixed mid-point and mid-tone contrast so that the mid-point and mid-tone contrast of images viewed on target displays 420 are automatically the same as those of the images when viewed on reference display 406.

A mapping having parameters that allow control over the luminance that a specific mid-point will be mapped to and control over mid-range contrast (as, for example are provided by the parameters $c_2$ and n of Equation (2)) can be applied to advantage in adjusting displays to account for ambient viewing conditions.

The human visual system reacts differently to images depending on its adaptation to light. For example, a viewer will perceive the same images on a television differently depending on whether the television is being viewed in an otherwise dark room or in a brightly lit room. Lateral adaptation describes the adaptation of a viewer's visual system to the brightness of the environment (including a display and its surroundings). Chromatic adaptation describes the adaptation of a viewer's visual system to the chromaticity of the viewer's surroundings (for example the color temperature of ambient lighting). Another environmental effect that can alter a viewer's perception of images on a display is viewing flare. Viewing flare describes the effect of screen reflections.

In general, lateral adaptation to brighter levels has the effect of raising what is perceived as "mid grey", and also the perceived contrast. Lateral adaptation may be compensated for by raising the midpoint and lowering the mid-tone contrast. In some embodiments, mapping units 422 receive input from an ambient light sensor 425 and are configured to increase the luminance to which the mid-point image value is mapped (for example, by adjusting the value of $c_2$ in a mapping function as provided by Equation (2)) and/or to decrease mid-tone contrast (for example, by adjusting the value of n in Equation (2)) in response to the input from ambient light sensor 425 indicating greater ambient light intensity.

Viewing flare has the effect of raising black level due to reflections of ambient light from a display screen. The result is typically a reduced dynamic range of the display and a crushing of dark detail. Viewing flare typically raises the level of the deepest black but the level of the peak white is mostly unaffected. Viewing flare can also cause desaturation of dark colors. Viewing flare can be compensated for by increasing the contrast in dark regions affected by the reflections. In some embodiments, mapping units 422 alter the mapping of dark levels in response to input from ambient light sensor 425 to increase contrast in dark regions in response to increases in ambient light. In some embodiments light sensor 425 is oriented to selectively detect light directed toward a screen of display 420 or a separate light sensor 425A is provided that selectively detects light directed toward the screen of display 420. In such embodiments, the boost in dark range contrast may be based on a measure of the ambient light directed toward the screen of display 420. The function used to boost dark contrast advantageously has an effect that tapers off with increasing image values such that mid-tones and highlights are not significantly affected. In an embodiment which applies the mapping function of Equation (2), increase in dark-range contrast may be achieved by adjusting the parameter $c_1$. Such a function may be implemented in various alternative ways including by pre-processing image values to increase dark level contrast prior to the normal mapping performed by mapping unit 422 or post-processing after the normal mapping performed by mapping unit 422 or by implementing an alternative mapping in mapping unit 422 that has one or more parameters permitting control of dark-range contrast.

Figure 5:
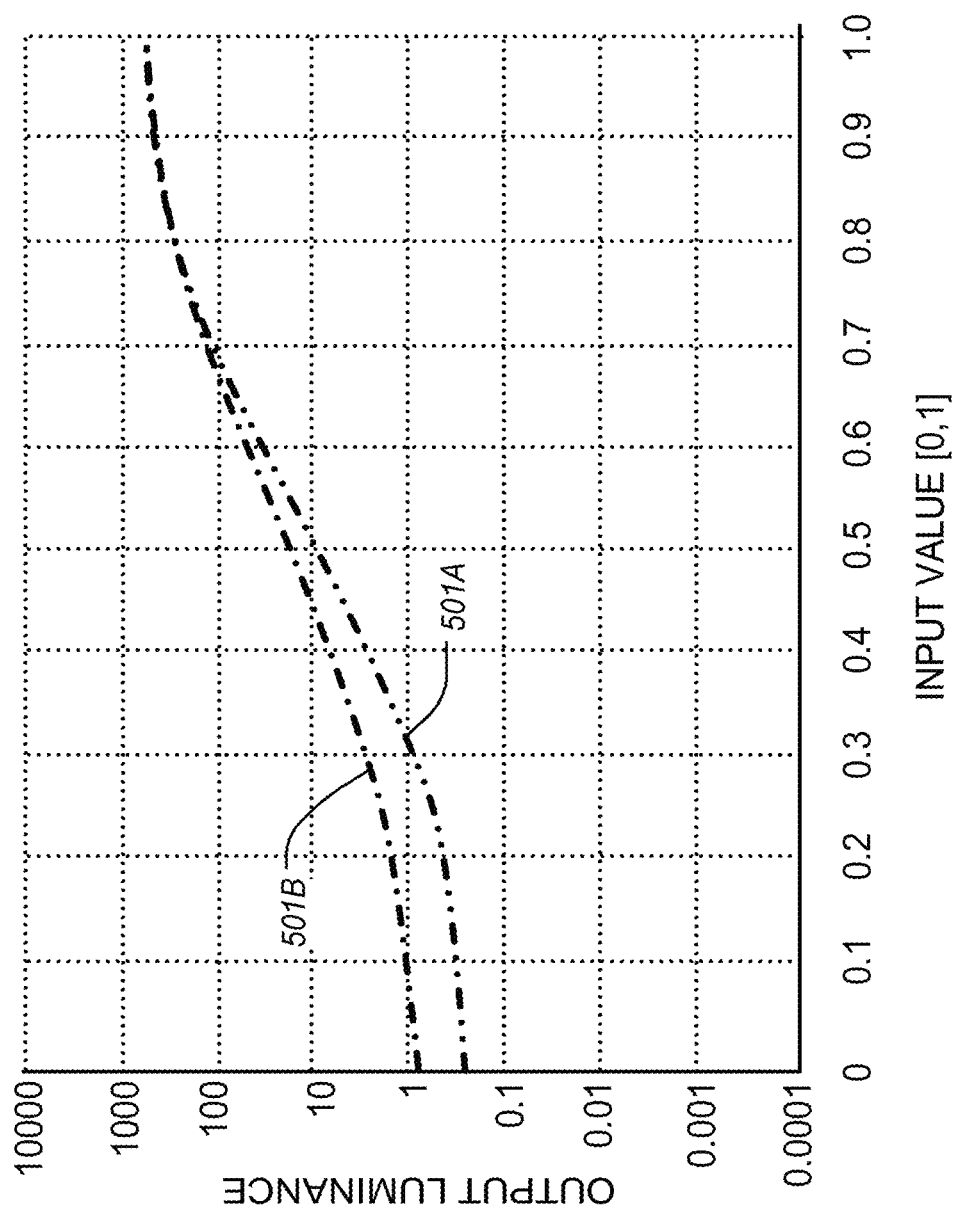
FIG. 5 shows example response curves that may be provided by a mapping unit for dim and bright ambient conditions.
Figure 5A:
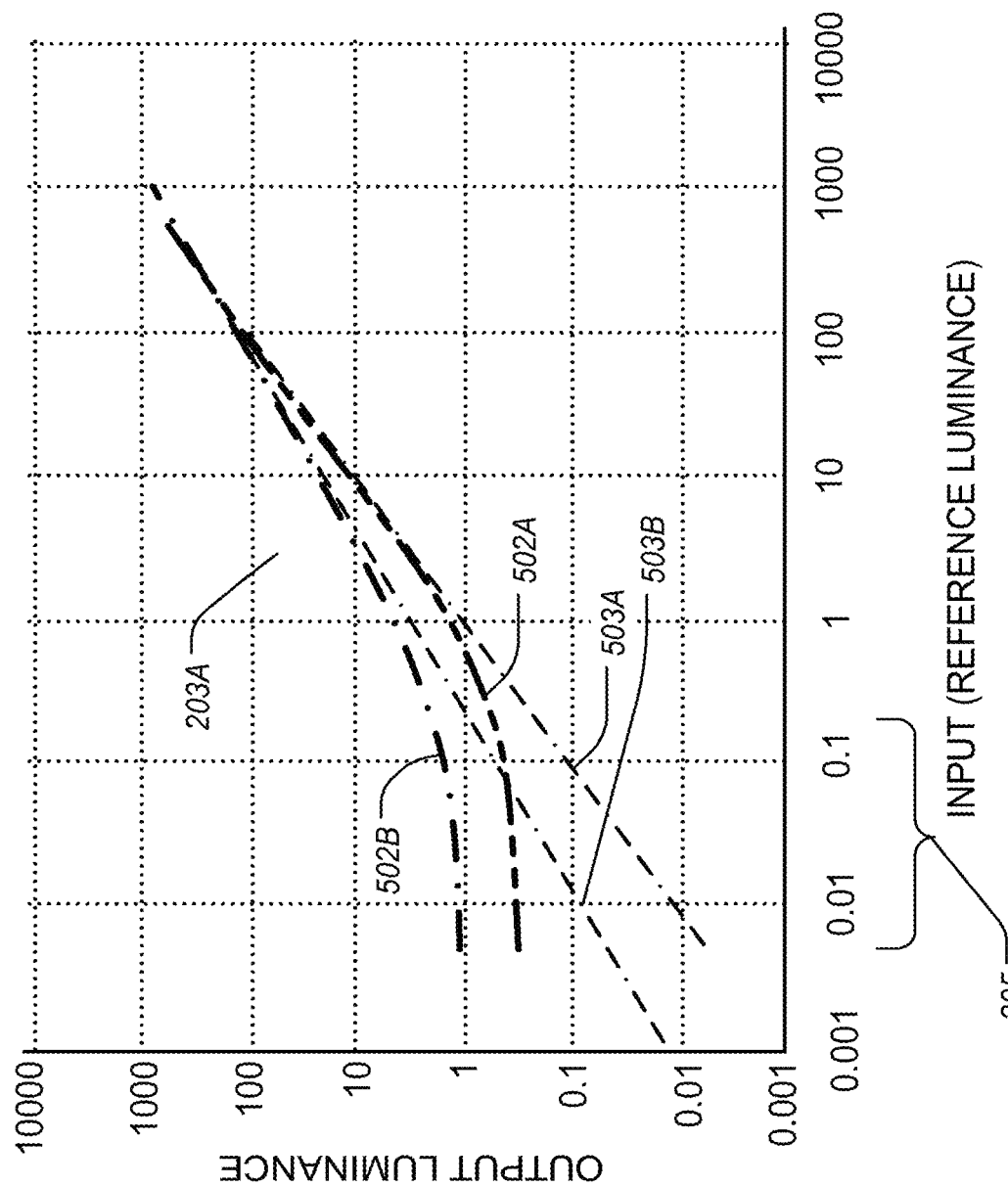
FIG. 5A shows system response curves corresponding to the response curves of FIG. 5.

FIG. 5 shows example response curves 501A and 501B that may be provided by a mapping unit 422 for dim and bright ambient conditions respectively. FIG. 5A shows corresponding system response curves 502A and 502B. In FIG. 5A, line 503A indicates an appearance match between the reference and target displays for the case of dim ambient conditions and line 503B indicates an appearance match between the reference and target displays for the case of bright ambient conditions.

Some embodiments estimate reflections of ambient light from a screen of display 420. Such reflections may be estimated from measurements of the ambient light by sensor(s) 425 and/or 425A and known optical characteristics of the display screen. In some embodiments a signal representing measured ambient light is multiplied by a factor which is determined empirically or based on knowledge of the optical characteristics of the display screen to obtain an estimate of reflected light that is added to the luminance created by the display of images on the display 420.

Adaptation of the human visual system to light may be estimated by inputting information about the history of light exposure to a mathematical model of the behavior of the human visual system. In some embodiments, mapping units 422 implement algorithms that apply such mathematical models using as inputs values received from one or more ambient light sensors 425 and/or information regarding the brightness of content displayed on display 420. The modeled adaptation will, in general be a function of past ambient conditions. The modeled adaptation may take into account light emitted by a display instead of or as well as other ambient light at a viewing location. In some embodiments, ambient light may be estimated based at least in part on the video data output by a mapping unit 422. In some embodiments, mapping units 422 implement methods and apparatus as described in U.S. application No. 61/433,454 filed on 17 Jan. 2011 and entitled "METHODS AND APPARATUS FOR ESTIMATING LIGHT ADAPTATION LEVELS OF PERSONS VIEWING DISPLAYS" which is hereby incorporated herein by reference for all purposes.

Light adaptation has a number of different aspects. In some embodiments, control over different aspects of the mapping performed by mapping units 422 is based on estimates of different adaptation aspects. For example, control over the luminance to which a mid-point image value is mapped may be based on an estimate of a general brightness adaptation. The general brightness adaptation may be based on the average brightness to which the viewer has been exposed over a time period characteristic of the general adaptation of the human visual system. Control over mid-range contrast may be based on an estimate of lateral brightness adaptation. Mapping unit 422 may apply a plurality of models to estimate a corresponding plurality of different types of adaptation and may control a corresponding plurality of different aspects of the mapping based on outputs of the plurality of models.

A mapping unit 422 may have any of a wide variety of constructions and may be implemented in software and/or hardware. Mapping units 422 may implement features as described in the commonly-assigned co-pending U.S. application Nos. 61/453,107 filed on 15 Mar. 2011 and entitled "METHODS AND APPARATUS FOR IMAGE DATA TRANSFORMATION" and/or 61/473,691 filed on 8 Apr. 2011 and entitled "IMAGE RANGE EXPANSION CONTROL METHODS AND APPARATUS" which are both hereby incorporated herein by reference for all purposes.

It can be appreciated that some embodiments provide a content delivery system in which image data distributed by the system is tailored for viewing on a "virtual display" having specified capabilities. The capabilities of the virtual display are specified in advance. When the content is to be viewed on a particular physical display (either a reference display or a target display), the content may be mapped as described herein in a manner which ensures that mid-range contrast and a mid-point value are displayed consistently while dark values and bright values are displayed according to the capabilities of the physical display. The distributed data may have redundant precision (i.e. greater precision than is required for displaying the data on a reference display) at least at values corresponding to brightness above a mid-range. The mappings may all have a specified functional form (e.g. a sigmoidal form). In such a system the approved appearance of distributed content may be preserved across a wide range of target displays.

Figure 6:
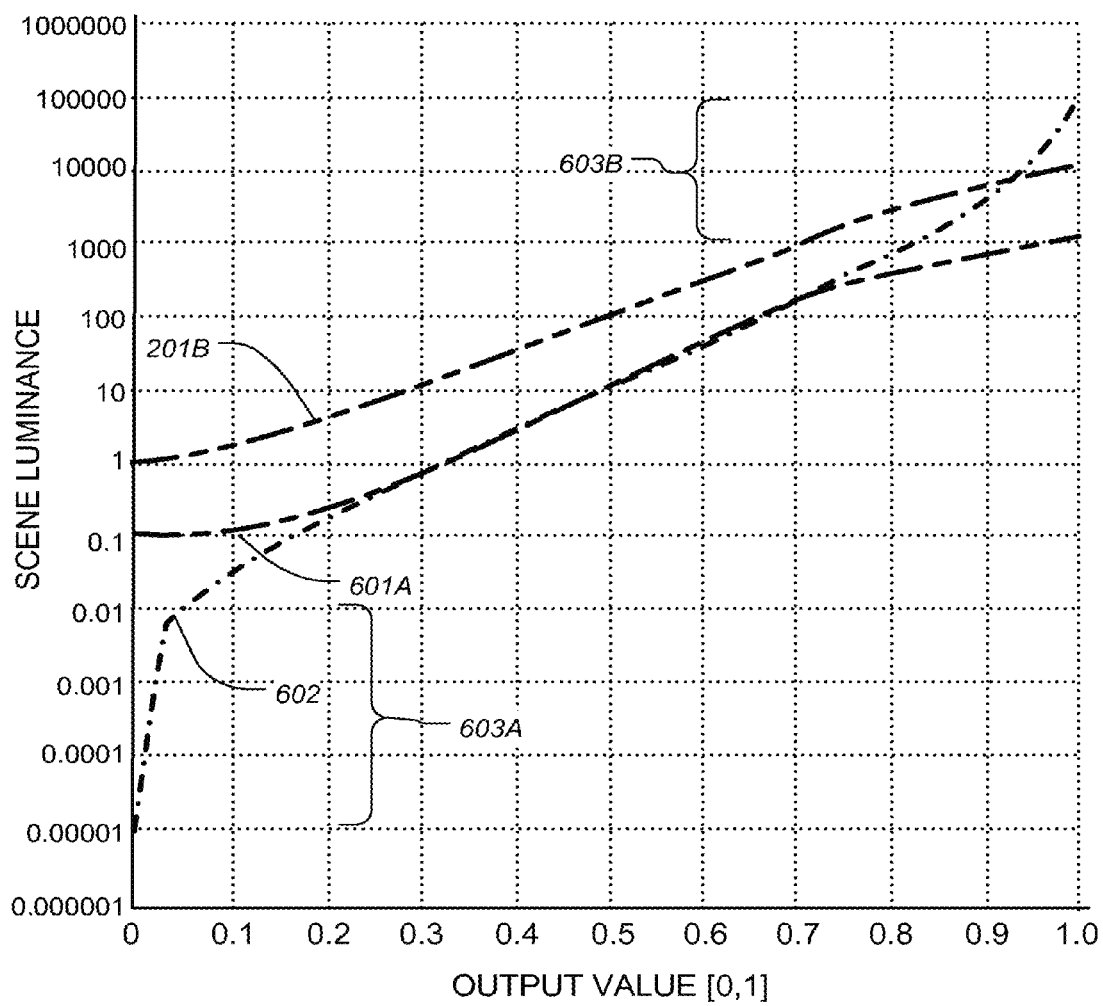
FIG. 6 shows possible response functions that may be provided in capture devices for different ambient lighting conditions.

For broadcast and other applications, a mapping as performed by mapping unit 410 may be provided in a camera or other image capture device. For example, a mapping unit 410 that implements a mapping according to Equation (2) may be associated with a camera. Some or all of the parameters $c_1$, $c_2$, $c_3$, and n may be adjusted manually or automatically to yield image data that provides a desired image on target display 420. The mapping may be adjusted to exploit the limited dynamic range and precision of the light sensor(s) in the capture device under the lighting conditions that the capture device is experiencing. FIG. 6 is a plot of possible response functions that may be provided in capture devices for different ambient lighting conditions. Curve 601A is an example response function for a capture device having a relatively low dynamic range operating to capture a dimly lit scene. Curve 601B is an example response function for the same capture device operating to capture a brightly lit scene. Curve 602 is an example response function for a capture device having a relatively high dynamic range operating to capture a dimly lit scene.

The gain and aperture on the capture device operate to shift the response curves curve up or down such that a fixed point in the mid-range of the curve is made to correspond to a midpoint of the output image values. The contrast is adjusted depending on the exposure.

It can be seen that curve 602 provides markedly increased contrast for extreme regions 603A and 603B of its dynamic range. These regions may be respectively called a dark end region and a bright end region. Such ranges may be outside of the range that can be realistically displayed by most target displays. Providing increased contrast in ranges 603A and 603B results in relatively more signal values being allocated to ranges that can be reproduced by typical displays and relatively fewer signal values being allocated to ranges 603A and 603B. This means that luminance values in regions 603A and 603B will be compressed when displayed on most target displays.

Where a capture device implements a response function as described above, the capture device may be operated to encode linear light levels into image values such that the midpoint and contrast are correct when processed by a mapping unit 422 and displayed on a display 420 without further processing. The overall system response from the combination of processing at the image capture device and at the display may:

cause the middle of the exposure of the captured scene to be displayed in the middle of the display's dynamic range;
allow for slight changes in mid-tone contrast to account for different viewing environments; and
fit the full captured range into the dynamic range of display 420 without further clipping of darks or brights.

Figure 7:
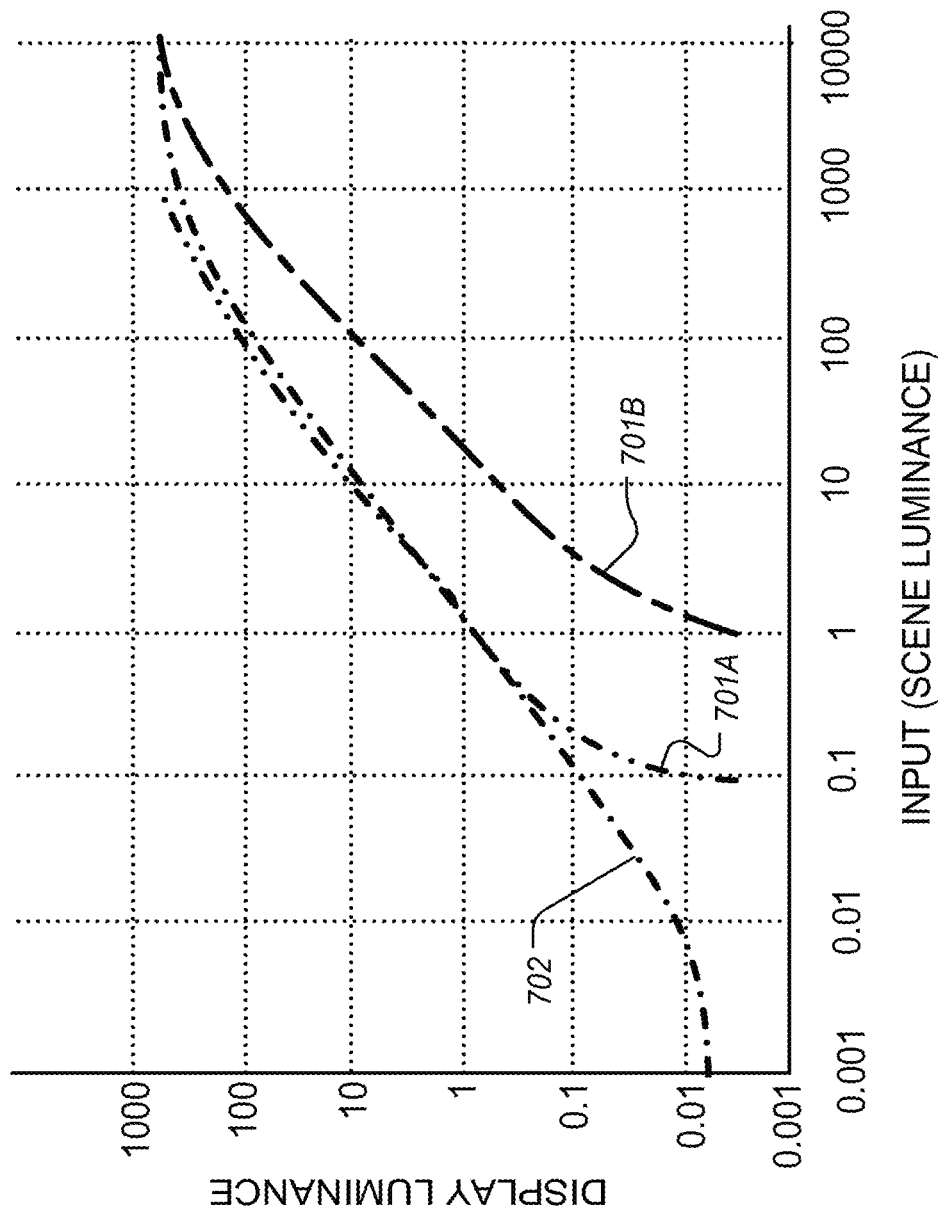
FIG. 7 shows example system response curves corresponding to the curves of FIG. 6.

FIG. 7 shows some example system response curves 701A, 701B, and 702 that correspond respectively to curves 601A, 601B, and 602 of FIG. 6. In FIG. 7, the "dim" environment corresponded to the center of the response curves at 10 nits. When displaying in the same environment, we see that the appearance is preserved by displaying this same portion at 10 nits. Curve 702B shows that in an image captured in a brighter environment with a mid-tone value at 100 nits, the mid-tone value gets mapped to 10 nits on the with a corresponding increase in contrast to account for the dimmer environment. Curves 701A and 702 show that, when operated to capture images in a dim environment, both standard dynamic range (SDR) and high dynamic range (HDR) sensors map the midrange correctly and smoothly roll-off in black and white according to the combined capabilities of the camera or other image capture device and display.

Certain implementations of the invention comprise computer processors which execute software instructions which cause the processors to perform a method of the invention. For example, one or more processors may implement methods as described herein by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the scope thereof.

What is claimed is:

1. An image capture device comprising:
    a light-sensing array operable to detect light;
    a mapping unit operatively coupled to the light-sensing array and configured to represent intensities of light sensed by elements of the light-sensing array as digital image values according to a response function; and
    an exposure compensation circuitry operatively coupled to the mapping unit and configured to control the mapping unit such that a fixed point in the mid-range of the response function is made to correspond to a midpoint of the output image values,
    the response function being based at least in part on a functional model of:

$$L_{OUT} = \frac{c_1 + c_2 L_{IN}^n}{1 + c_3 L_{IN}^n}$$

with $L_{OUT}$ being an output of the mapping, $L_{IN}$ being an input of the mapping, and n, $c_1$, $c_2$, and $c_3$ being numeric parameters of the exposure compensation mechanism that control the mapping unit.

2. The image capture device according to claim 1 wherein the exposure compensation circuitry is configured to adjust a mid-range contrast of the response function based on an exposure.

3. The image capture device according to claim 2, wherein the exposure compensation circuitry adjusts the mid-range contrast via control of a value of the numeric parameter n.

4. The image capture device according to claim 2, wherein the exposure compensation circuitry sets the fixed-point via control of a value of the numeric parameter $c_2$.

5. The image capture device according to claim 1 wherein the response function corresponds to a response curve having a mid-tone slope, a dark end slope and a bright end slope and the mid-range slope is smaller than either of the dark end slope and the bright end slope.

6. The image capture device according to claim 1, wherein the exposure compensation circuitry controls the response function of the mapping unit according to a dynamic range and precision of the light-sensing array.

7. The image capture device according to claim 6, wherein the control of the response function is performed via adjustment of one or both of the numeric parameters $c_1$ and $c_3$.

\* \* \* \* \*